United States Patent Office 3,404,174
Patented Oct. 1, 1968

3,404,174
PREPARATION OF UNSATURATED
DICARBOXYLIC ACID ESTERS
James C. Wygant, Creve Coeur, Mo., assignor to Monsanto Company, St. Louis, Mo., a corporation of Delaware
No Drawing. Filed July 21, 1965, Ser. No. 473,864
The portion of the term of the patent subsequent to Dec. 26, 1984, has been disclaimed
14 Claims. (Cl. 260—485)

ABSTRACT OF THE DISCLOSURE

This invention relates to a process for the preparation of bis(2,3 - dihydroxypropyl)$\alpha,\beta$ - ethylenically unsaturated dicarboxylic acid esters. According to this invention bis (2,3 - dihydroxypropyl)$\alpha,\beta$ - ethylenically unsaturated dicarboxylic acid esters are prepared by a process which comprises reacting an $\alpha,\beta$ - ethylenically unsaturated dicarboxylic acid with glycidol in an inert organic solvent in the presence of certain basic catalysts and terminating the reaction when the ester product has a certain acid number.

---

Bis(2,3 - dihydroxypropyl)$\alpha,\beta$ - ethylenically unsaturated dicarboxylic acid esters are of particular interest for copolymerization with other monomers having olefinic unsaturation, e.g. vinyl chloride. The resulting copolymers have free hydroxyl groups which provide sites for further reaction such as crosslinking.

Acid number as used herein is a number which indicates the amount of free acid present in a substance and is expressed by the number of mg. of potassium hydroxide which are required to neutralize the acid in a gm. of the substance.

The monomers of this invention are prepared by the above process in excellent yields without the formation of excessive polymer and without the use of polymerization inhibitor. Product control is maintained by periodic determination of the acid number of the ester product and the reaction is terminated when a certain acid number is obtained.

Although any $\alpha,\beta$-ethylenically unsaturated dicarboxylic acid can be used in accordance with this invention the preferred acids are fumaric, maleic, itaconic, citraconic, mesaconic and aconitic.

Although any of the above preferred dicarboxylic acids or mixtures of such dicarboxylic acids are operable in the process of this invention, fumaric acid and maleic acid are particularly advantageous. Mixtures of two or more unsaturated dicarboxylic acids in varying proportions, i.e. 10–90 parts fumaric acid and 90–10 parts maleic acid, may be used in place of only one acid.

For the sake of brevity and simplicity this invention will be discussed hereinafter with reference to the reaction of fumaric acid with glycidol as set forth below.

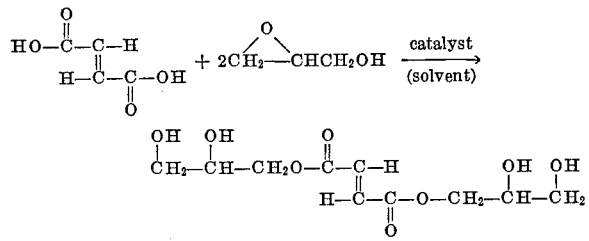

In carrying out the process of this invention, fumaric acid, solvent and catalyst are charged to a reaction vessel and heated to reaction temperature. Glycidol is added to the reaction mixture throughout at least a substantial period of the reaction and reaction is allowed to proceed until the desired acid number is obtained. Continuous or intermittent addition or glycidol can be used. Careful control must be exercised to terminate the reaction at the proper time. The ester products of this reaction should have a final acid number of about five to thirty, and preferably of about five to fifteen.

If the reaction is stopped when the ester product has a relatively high acid number there will be a large percentage of unconverted fumaric acid and/or 2,3-dihydroxypropyl hydrogen fumarate. If reaction is continued until the acid number of the ester product drops to below about five a large amount of polymerized product begins to form and this renders the product blend unsuitable for subsequent use as a monomer. Therefore it is impractical to attempt to achieve complete conversion of fumaric acid to bis(2,3 - dihydroxypropyl)fumarate and reaction must be halted before an ester product acid number of substantially less than five is reached. However, the reaction should be run so as to obtain as low an acid number as possible observing this limitation.

The acid number of the ester products of this invention may be determined by various methods. Usually a sample of the reaction mixture is taken at intervals during reaction, dissolved in a solvent such as ethyl alcohol and titrated with standard potassium hydroxide solution to determine its acid number. The acid number of the ester product contained therein is then easily calculated from the acid number of this solution by correcting for the total weight of both the reaction solvent and titration solvent.

The reaction product is purified by conventional procedures to give the desired bis(2,3-dihydroxypropyl) fumarate. Excess glycidol and solvent may be stripped off or distilled from the reaction product. If desired the stripped product may be dissolved in a non-solvent for the catalyst to remove any catalyst remaining and then the solvent removed by conventional means. Product purification is greatly simplified since a polymerization inhibitor is not required.

A polymerization inhibitor to protect against vinyl polymerization may be added to the charge even though such inhibitors are not required. Common polymerization inhibitors include p - (t - butyl)catechol, hydroquinone, benzoquinone, p-phenylene diamine, trinitrobenzene, picric acid, etc. When a polymerization inhibitor is used, it is generally introduced in about one-tenth to fifty parts per thousand based on the weight of fumaric acid employed.

The following examples will serve to illustrate the invention. Parts and percent are by weight unless otherwise indicated.

EXAMPLE 1

To a reaction vessel equipped with thermometer, stirring means, reflux condenser, safety feed funnel and sample outlet is charged 58 gm. (0.5 mols) fumaric acid, 73 ml. (58 grams) methyl isobutyl ketone and 1.6 ml. (2 wt. equivalent percent) pyridine. After the reaction vessel is flushed with nitrogen, the stirrer is started and the reaction mixture is heated to about 90° C. and maintained at about 90° C. throughout the reaction. A total of 90 ml. (100 grams) glycidol is fed into the reaction vessel through the addition funnel over a period of 1½ hours. In order to follow the course of the reaction a sample is taken, dissolved in ethyl alcohol and titrated with standard potassium hydroxide solution to determine its acid number. This procedure is repeated at given intervals until the acid number of the ester product is in the range of about 5 to 30. In this example the run is terminated after about two hours when the acid number of the reaction mixture is 8.4, corresponding to an acid number of about 13 for the ester contained therein. The two phase reaction medium is allowed to cool and the phases are separated. The lower phase containing the product amounts to about 163 grams. The solvent and unreacted glycidol are removed from the product phase by vacuum film distillation at 100° C. (0.22 to 0.25 mm.) over 1 hour and 25 minutes. The residue of bis(2,3-dihydroxypropyl) fumarate so obtained is a clear yellow oil containing but a small amount of other monomer or polymerized products.

*Analysis.*—Calculated for $C_{10}H_{16}O_8$: C, 45.5; H, 6.1; OH, 25.7; Sap. Eq. 132. Found: C, 45.9; H, 6.4; OH, 24.4; Sap. Eq. 129.

EXAMPLES 2–12

Following the general procedure and using the paparatus of Example 1, other reactions are carried out as indicated in Table 1. The acid reactant is readily determined by referring to the product obtained and using the symbols:

F=bis(2,3-dihydroxypropyl) fumarate
M=bis(2,3-dihydroxypropyl) maleate
I=bis(2,3-dihydroxypropyl) itaconate.

In each Example 2–12 the following amounts and conditions are used:

(1) One mol of acid.
(2) A mol ratio of glycidol to acid of 2.5 to 1.
(3) Reaction temperature of about 100° C.
(4) Reaction time from about 1½ to 3 hours; the exact time being determined by the time required to obtain the indicated acid numbers for the ester products.
(5) The reactions are terminated when the acid numbers indicated are obtained.
(6) The catalyst is used in an amount of 2 wt. equivalent percent based on the acid.

The various products are obtained in high yield and a high state of purity after solvent removal by distillation.

TABLE 1

| Example No. | Catalyst | Solvent | Acid No. | Product |
|---|---|---|---|---|
| 2 | Triphenylphosphine | Ethylene glycol diethyl ether. | 11.1 | F |
| 3 | Tributylphosphine | n-Butylether | 7.6 | F |
| 4 | Diethylphosphine | Sec-butylether | 7.1 | I |
| 5 | Phenylphosphine | Methylisobutylketone | 5.6 | M |
| 6 | Aniline | Methylisoamylketone | 7.7 | M |
| 7 | Triethylamine | Diisopropylketone | 9.0 | F |
| 8 | Diphenylamine | Methylcyclohexanone | 8.5 | I |
| 9 | Triphenylamine | 1,4-dioxane | 12.9 | M |
| 10 | Pyridazine | Cyclohexane | 6.2 | I |
| 11 | Pyrimidine | Methylisobutylketone | 13.6 | F |
| 12 | β-Picoline | Xylene | 4.9 | F |

The fumaric acid-glycidol reaction of this invention is catalyzed by introducing certain basic (i.e. nucleophilic) catalysts such as:

(1) Organic phosphines having the formula:

$$(R)_nP(H)_{(3-n)}$$

wherein each R is independently selected from the group consisting of substituted and unsubstituted, branched and straight chain, saturated and unsaturated alkyl groups, substituted and unsubstituted, saturated and unsaturated alicyclic groups, and substituted and unsubstituted aryl groups, and n is an integer from 1 to 3; and (2) Amine compounds e.g. primary, secondary and tertiary amines, quaternary ammonium compounds, amine oxides, heterocyclic amines and derivatives thereof.

In the organic phosphine catalysts when R is an alkyl hydrocarbon radical, substituents such as methyl, ethyl, propyl, isopropyl, n-butyl, isobutyl, amyl, hexyl heptyl, and octyl are preferred; when R is an aryl hydrocarbon radical, substituents such as phenyl and alkyl substituted phenyl are preferred; and when R is an alicyclic hydrocarbon radical, substituents such as cyclopentyl and cyclohexenyl are preferred.

Illustrative examples of nucleophilic phosphines which may be used in this invention include methylphosphine, ethyphosphine, propylphosphine, isopropylphosphine, amylphosphine, hexylphosphine, octylphosphine, diethylphosphine, di - n - butylphosphine, diheptylphosphine, ethylmethylphosphine, ethylphenylphosphine, diphenylphosphine, triethylphosphine, tributylphosphine, triamylphosphine, ethyldiphenylphosphine, benzyldimethylphosphine, trimethylphosphine, trioctylphosphine, triisobutylphosphine, tricyclopentylphosphine, tricyclohexenylphosphine, triphenylphosphine, tris(2-carboxyethyl)phosphine, trivinylphosphine, tris(2-butoxyethyl)phosphine, tristrifluoroethylphosphine.

Other suitable substituents for the organic phosphine catalysts are cyano, amino, hydroxyl, carbamyl, acyloxy, carbalkoxy, carboxy, alkyloxy, aryloxy, and the like.

The preferred primary, secondary and tertiary alkyl and aryl amine catalysts are those wherein the alkyl hydrocarbon radical contains 1 to 18 carbon atoms and the aryl radical is phenyl and alkyl substituted phenyl. Heterocyclic amines such as the aromatic N-heterocyclic, e.g. pyridine and derivatives thereof, are preferred.

Illustrative examples of basic amine catalysts which may be used include: aniline, dimethylaniline, trimethylamine, triethylamine, tri - n - butylamine, diethylamine, ethylmethylamine, n - propylamine, isopropylamine, trioctylamine, ethylenediamine, trioctadecylamine, tri-n-propylamine, diamylamine, diphenylamine, dihexylamine, triheptylamine, triphenylamine, pyridazine, pyrimidine, quinoline, pyridine, trimethylamine oxide, bis(benzyltrimethylammonium)fumarate, tetraethylammonium acetate, β-picoline, etc.

Particularly preferred catalysts are the trialkylphosphines, triarylphosphines, tertiary amines, and aromatic heterocyclic amines. The trialkylphosphines and triarylphosphines have no hydrogens attached directly to the phosphorus atom and the tertiary amines and aromatic N-heterocyclics have no hydrogens located on their nitrogen atoms. Therefore there can be no side reaction with glycidol as is possible when dialkylphosphines, secondary and primary amines, etc., are employed as catalysts. Alkali metal and alkaline earth metal salts do not function as catalysts in the process of this invention.

Preferably about two to five weight equivalent percent of catalyst based on fumaric acid is used to catalyze the glycidol reaction. Higher amounts of catalyst such as ten weight equivalent percent or more based on fumaric acid can be used; however, this causes a correspondingly reduced yield of product. On the other hand as little as about one equivalent percent based on the fumaric acid can be used by extending the reaction time.

The process of the present invention must be carried out in the presence of an inert organic solvent. Illustrative examples of inert organic solvents which may be used include hydrocarbons, e.g. benzene, toluene, xylene, cyclohexane, methylcyclohexane, n-heptane, etc.; ethers, e.g. isopropyl ether, n-butyl ether, 1,4-dioxane, isobutyl ether, ethylene glycol diethyl ether, etc.; ketones, e.g. methyl isopropyl ketone, methyl isobutyl ketone, methyl isoamyl ketone, diisopropyl ketone, cyclohexanone, etc.;

alcohols, e.g. n-propyl alcohol, isopropyl alcohol, n-butyl alcohol, isobutyl alcohol, amyl alcohol, hexyl alcohol, etc.; organic halides, e.g. carbon tetrachloride, n-butyl chloride, ethylene dichloride, tetrachloroethylene, etc.; esters, e.g. ethyl acetate, n-propyl acetate, methyl n-butyrate, isobutyl acetate, amyl acetate, etc.

Preferred solvents are those that provide the best balance between solvent power for fumaric acid and inertness to glycidol. Examples of such preferred solvents are the ketones and ethers listed in the preceding paragraph.

The amount of solvent for the reaction can be varied over a wide range. At least enough should be used to provide a stirrable slurry and the maximum limit is dictated only by the size of the reaction vessel available. However, the amount of solvent used is generally from about fifty to five hundred percent based on the weight of fumaric acid in the charge. Commonly the quantity of solvent employed is in the range from about fifty to one hundred and fifty percent by weight of the fumaric acid present.

Reaction temperature is not critical but is generally maintained from about 50° C. to 250° C. Preferably the reaction temperature should not exceed about 275° C. since undesirable polymerization may be thermally initiated at such high temperatures. Still more preferred are reaction temperatures in the range from about 50° C. to 220° C. with temperatures of about 50° C. to 125° C. being considered the most satisfactory from the standpoint of optimum conversion and suppression of undesirable side reactions.

Atmospheric, superatmospheric or subatmospheric pressures can be employed in the reaction. Atmospheric pressures are particularly suitable.

What is claimed is:

1. Process for preparing bis(2,3 - dihydroxypropyl) α,β - ethylenically unsaturated dicarboxylic acid esters which comprises reacting glycidol with an α,β - ethylenically unsaturated dicarboxylic acid in an inert organic solvent in the presence of up to about 10 weight equivalent percent of a basic catalyst at a reaction temperature from about 50° C. to 250° C. and terminating the reaction when the acid number of the ester product is about 5 to 30, said basic catalyst being selected from the group consisting of amines having up to 3 alkyl groups of 1 to 18 carbon atoms attached to the nitrogen, amines having up to 3 aryl groups selected from the group consisting of phenyl and alkyl substituted phenyl attached to the nitrogen, aromatic N-heterocyclic amines, dimethylaniline and phosphines of the formula:

$$(R)_nP(H)_{(3-n)}$$

in which R is selected from the group consisting of alkyl, cyclopentyl, cyclohexyl and aryl hydrocarbon radicals and $n$ is an integer from 1 to 3.

2. Process for preparing bis(2,3 - dihydroxypropyl) α,β - ethylenically unsaturated dicarboxylic acid esters which comprises reacting glycidol with an α,β - ethylenically unsaturated dicarboxylic acid selected from the group consisting of fumaric acid, maleic acid and itaconic acid in an inert organic solvent in the presence of about 1 to 10 weight equivalent percent of a basic catalyst at a reaction temperature from about 50° C. to 250° C. and terminating the reaction when the acid number of the ester product is about 5 to 30, said basic catalyst being selected from the group consisting of amines having up to 3 alkyl groups of 1 to 18 carbon atoms attached to the nitrogen, amines having up to 3 aryl groups selected from the group consisting of phenyl and substituted phenyl attached to the nitrogen, aromatic N-heterocyclic amines, dimethylaniline and phosphines of the formula:

$$(R)_nP(H)_{(3-n)}$$

in which R is selected from the group consisting of alkyl, cyclopentyl, cyclohexyl and aryl hydrocarbon radicals and $n$ is an integer from 1 to 3.

3. The process of claim 1 wherein the catalyst is a trialkyl phosphine.

4. The process of claim 3 wherein the catalyst is tributyl phosphine.

5. The process of claim 1 wherein the catalyst is an aryl phosphine containing up to three aryl groups.

6. The process of claim 5 wherein the catalyst is triphenyl phosphine.

7. The process of claim 1 wherein the acid is fumaric acid.

8. Process for preparing bis(2,3 - dihydroxypropyl) α,β - ethylenically unsaturated dicarboxylic acid esters which comprises reacting glycidol with an α,β - ethylenically unsaturated dicarboxylic acid in an inert organic solvent selected from the group consisting of ketones and ethers in the presence of about 2 to 5 weight equivalent percent of a basic catalyst at a reaction temperature of about 50° C. to 125° C. and terminating the reaction when the acid number of the ester product is about 5 to 15, said basic catalyst being selected from the group consisting of alkyl amines having 3 alkyl groups of 1 to 18 carbon atoms attached to the nitrogen, amines having 3 aryl groups wherein the aryl is selected from phenyl and alkyl substituted phenyl, aromatic N-heterocyclic amines and phosphines of the formula $$(R)_nP(H)_{(3-n)}$$

in which R is selected from the group consisting of alkyl and aryl radicals and $n$ is an integer from 1 to 3.

9. The process of claim 8 wherein the organic solvent is n-butyl ether.

10. The process of claim 8 wherein the organic solvent is methyl isopropyl ketone.

11. The process of claim 8 wherein the organic solvent is methyl isobutyl ketone.

12. Process of claim 8 wherein the catalyst is pyridine.

13. Process of claim 8 wherein the catalyt is triphenyl amine.

14. Process of claim 8 wherein the catalyst is triphenylphosphine.

References Cited

UNITED STATES PATENTS 2,929,835   3/1960   Hayes et al. _____ 260—486
3,234,249   2/1966   Brack _____ 260—485

LORRAINE A. WEINBERGER, *Primary Examiner.*

T. L. GALLOWAY, *Assistant Examiner.*